United States Patent [19]

Frye

[11] 4,357,893
[45] Nov. 9, 1982

[54] ALL-TERRAIN VEHICLE OF THE MOTORCYCLE TYPE

[76] Inventor: Norman V. Frye, R.R. #4, Davenport, Iowa 52804

[21] Appl. No.: 193,678

[22] Filed: Oct. 3, 1980

[51] Int. Cl.³ .............................................. B63B 1/32
[52] U.S. Cl. ...................... 114/288; 280/8; 180/182; 180/116; 114/270
[58] Field of Search ............... 114/67 A, 270, 288; 280/8, 13; 180/126, 116, 182, 183

[56] References Cited

U.S. PATENT DOCUMENTS

| | | | |
|---|---|---|---|
| 1,672,613 | 6/1928 | Howell | 114/270 |
| 1,698,482 | 1/1929 | Nicin | 180/116 |
| 2,399,141 | 4/1946 | Quinn | 114/270 |
| 2,400,132 | 5/1946 | Porter | 114/270 |
| 3,191,705 | 6/1965 | Jones et al. | 180/126 |
| 3,267,898 | 8/1966 | Evans | 114/67 A |
| 3,418,960 | 12/1968 | Nelson | 114/270 |
| 3,521,566 | 7/1970 | Veldhuizen | 180/116 |
| 3,536,154 | 10/1970 | Faure | 180/116 |
| 3,848,560 | 11/1974 | Du Bose | 114/270 |
| 3,951,093 | 4/1976 | Poche | 114/67 A |
| 3,983,832 | 10/1976 | Kinder | 114/270 |
| 4,133,282 | 1/1979 | Cockerell | 180/126 |
| 4,157,739 | 6/1979 | Frye | 180/224 |

FOREIGN PATENT DOCUMENTS 1019047 2/1966 United Kingdom ............... 180/116
1234000 6/1971 United Kingdom .

*Primary Examiner*—Trygve M. Blix
*Assistant Examiner*—Thomas J. Brahan
*Attorney, Agent, or Firm*—Henderson & Sturm

[57] ABSTRACT

A motorcycle having a body carried on front and rear power-driven wheels in which the wheels are provided with novel tread design cooperating with the body and portions thereof to literally pump water rearwardly while confining it to ridge or crest form centered on the longitudinal centerline of the vehicle whereby to enable the vehicle to travel over water. The body is closed at its top, opposite sides and also at its front and rear ends by front and rear fender wells, respectively, creating an air chamber beneath which the front wheel pumps water to flow rearwardly as aforesaid.

2 Claims, 11 Drawing Figures

ALL-TERRAIN VEHICLE OF THE MOTORCYCLE TYPE

BRIEF SUMMARY OF THE INVENTION

The present invention is an improvement of the vehicle disclosed in my U.S. Pat. No. 4,157,739, wherein is shown a front and rear wheel powered motorcycle having a body forming a downwardly opening air chamber delineated at opposite fore-and-aft sides by skids or runners. Although that vehicle is capable of traversing water, its ability to do so depends very much on the attainment of a flying start by the vehicle so as to enable it to skim over the water. According to the present invention, the basic design is improved by the provision of changes in the body design and the use of special treads on the front and rear wheels. Each tread comprises at least a pair of annular rows of radial fins spaced circumferentially apart about the periphery of the tread. Each fin in each row is directed both axially and circumferentially so as to slant or slope toward the median plane of the tread in a direction counter to the direction of rotation of the wheel when the vehicle travels forwardly. The inner ends of the fins terminate short of the median plane of the tread, leaving an annular space therebetween. The slant or slope of the fins is such that they operate to direct water rearwardly beneath the wheel and into the annular space, literally pumping water rearwardly beneath the body. The tread also includes at each radial side thereof a circular wall which closes the outer ends of the fins in the respective row of fins, thus preventing lateral outward escape of water and contributing to the confinement of the water to form a crest or ridge centered on the longitudinal median plane of the vehicle. The rear, lower portion of the front fender wall is extended as a surfing member which rides the crest of water. As stated above, the body forms a downwardly opening air chamber and this, together with the surfing portion and a similar surfing portion at the front, lower portion of the rear fender well, enables the vehicle to ride over the water so long as the wheels continue pumping. The treads are relatively axially wide—in the order of twelve to seventeen inches across—and are formed on pneumatic tires, adding to the floatability of the vehicle in case some mechanical malfunction causes a cessation of power. Further, the outer circular radial walls, which are of a diameter matching that of the outer periphery of the rows of fins, provide smooth running rims for travel of the vehicle over hard surfaces. The width of the treads increases stability of of the vehicle and accommodates lateral changes in the center of gravity of the vehicle and rider. A modification of the invention adds a further feature in the form of front and rear ski-like means respectively flanking opposite sides of the front and rear wheels to augment the flotation ability of the vehicle. These may take any form suitable for the purpose, as will become apparent later. Also, these means are steerable respectively with the wheels and may be detached and installed as required. These and other features will become apparent as a preferred embodiment of the vehicle is presented in the following description and accompanying sheets of drawings.

DETAILED DESCRIPTION

Figure 2:
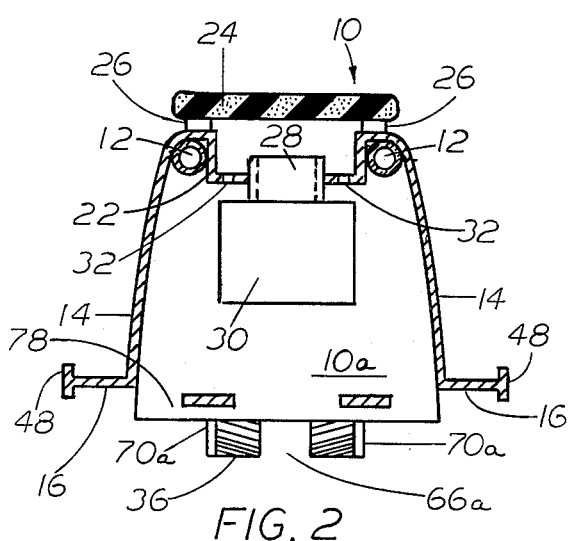
FIG. 2 is a section as seen generally along the line 2—2 of FIG. 1.

Many of the basic components of the vehicle structure itself may be similar to those disclosed in my prior patent and therefore will be referred to and described here with a minimum of detail. The cycle has a fore-and-aft body 10 including a pair of longitudinal tubular frame members 12 from which depend fore-and-aft side sheets 14, each of which terminates in a longitudinal runner 16. The front end of the body is closed by a front fender well 18 and a rear fender well 20 closes the rear end of the body. The body thus forms an air chamber 10a opening downwardly. As seen in FIG. 2, the side sheets extend inwardly over the respective tubes 12 and a transverse partition 22 extends across between the tubes. An elongated seat 24 overlies the body and is slightly spaced above the body to provide an air inlet 26. An air intake 28 extends upwardly through the partition 22 to draw air in via the inlets, such as under the action of a fan (not shown) powered by a power source such as an internal combustion engine 30, suitably supported within the air chamber 10a. The manner of supporting the engine, etc., may be derived from my prior patent. The partition 22 has a plurality of apertures 32 therein for the purpose of draining any water that may enter via the air inlet 26.

Figure 4:
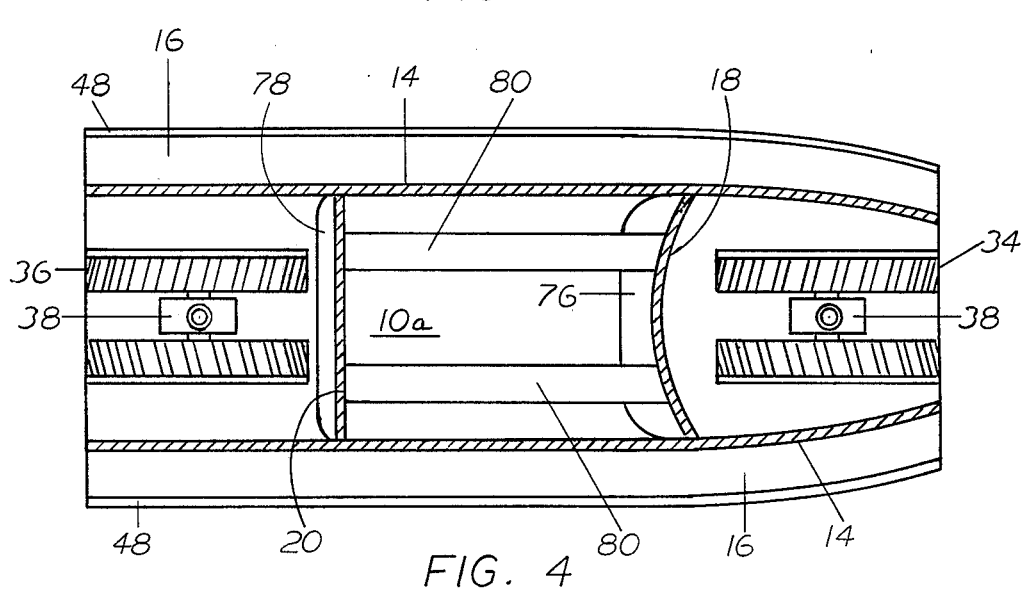
FIG. 4 is a section on the line 4—4 of FIG. 1, the vehicle power source having been omitted in the interests of clarity.

The body is carried by front and rear wheel means 34 and 36 located respectively in the front and rear fender wells. As best shown in FIGS. 2 and 4, these may be of the dual type powered by suitable hydraulic motors 38 driven by a hydraulic pump 40 in turn driven by the engine 30 by any appropriate hydraulic system, a representative type of which is shown in my prior patent. The front pump 38 is carried at the lower end of an upright support 42 which has its upper end typically journalled in the front end of the body for steering of the front wheel as by handle bars 44. The rear pump is similarly mounted via a support 46 which is also steerable. Steering linkage, not shown here but one type of which appears in my prior patent, interconnects the front and rear steerable supports for conjoint steering of the front and rear wheels. The runners 16 are extended forwardly and rearwardly along the front and rear portions of the side sheets that lie respectively alongside the front and rear wheels and form respective parts of the fender wells. Each runner may include along its lower edge a longitudinal strip 48, each of which projects both above and below the general plane of its runner. These serve at least three purposes. The lower part acts as a cutter and divider of brush, etc., acts as a skirt to contain air and water pressure and the upper part prevents the rider's feet from slipping laterally off the runner.

Figure 1:
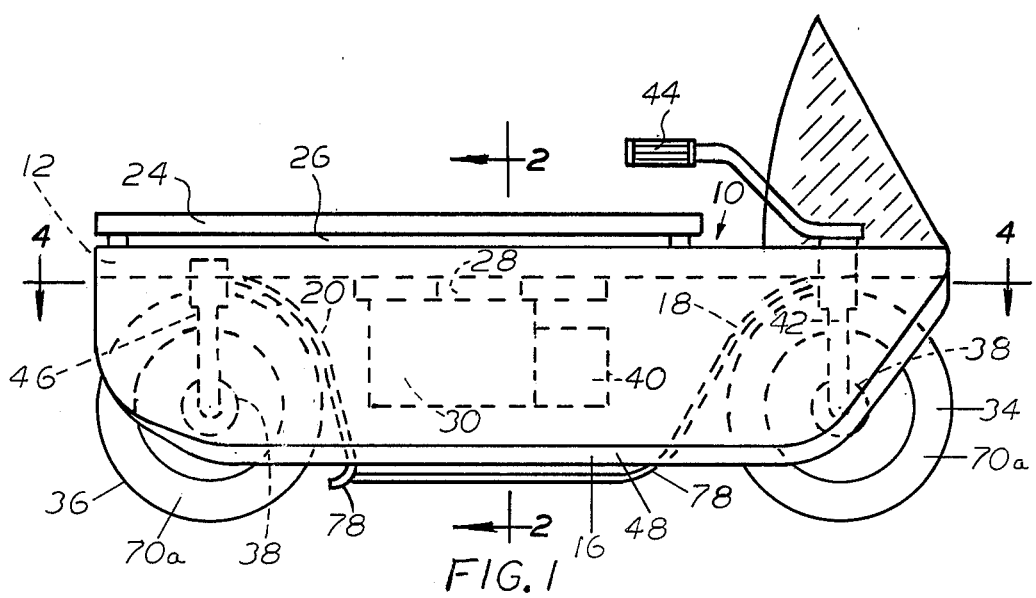
FIG. 1 is a side elevation of the vehicle.
Figure 3:
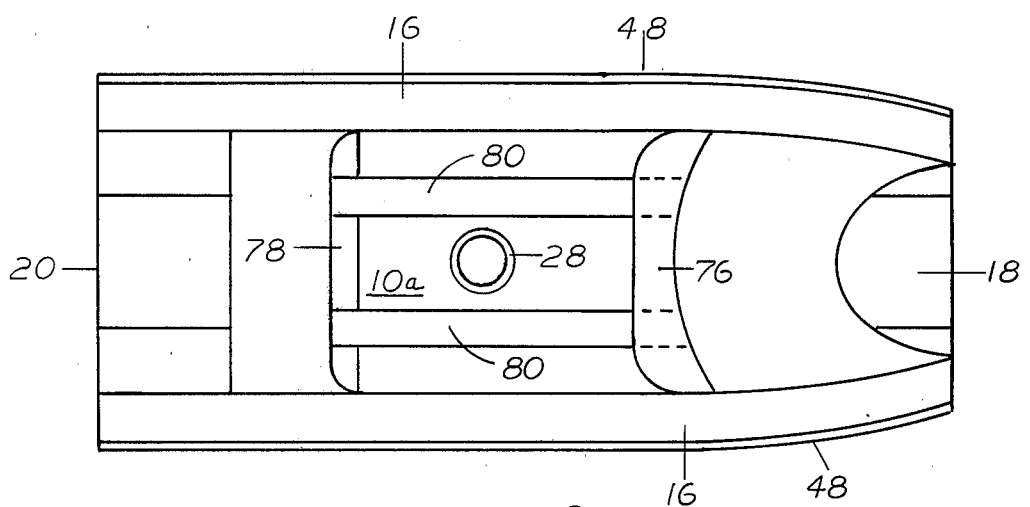
FIG. 3 is a bottom plan of the vehicle body by itself.
Figure 5:
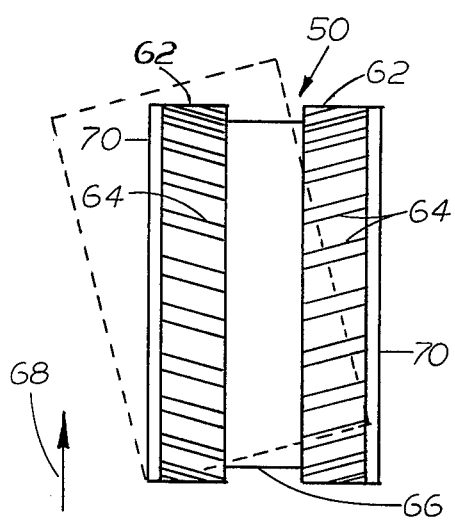
FIG. 5 is an end view of one of the wheel means, the dotted lines indicating the tiltability of the wheel to accommodate lateral changes in the center of gravity
Figure 6:
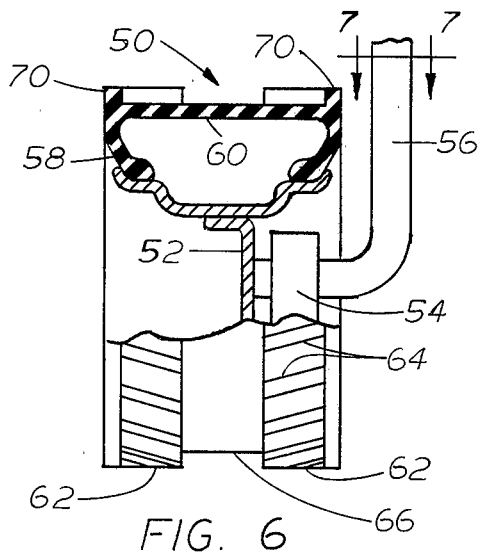
FIG. 6 is a part section showing the wheel and tire together with a portion of a fork or support and a representative hydraulic wheel motor.
Figure 7:
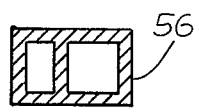
FIG. 7 is an enlarged section as seen along the line 7—7 of FIG. 6.

As an alternative to the dual wheel means shown in FIGS. 2 and 4, each wheel means may be of the single type as shown at 50 in FIGS. 5 and 6. Thus each wheel has a central body 52 of the drop-center type driven by a hydraulic motor 54 of the same type as that shown at 38 in FIGS. 1 and 4. This motor is suitably carried at the lower end of an upright support 56 that serves the same purposes as those shown at 42 and 46, except that this support extends perforce alongside the single, wide wheel. If desired, the support may be of dual cross-section (FIG. 7) for accommodating the pressure and return lines between the hydraulic pump 40 and the wheel motors. This construction avoids the use of external hoses, etc.

The wheel means carries a pneumatic tire 58 having peripheral tread means 60 of a width in the order of from twelve to seventeen inches. This tread is provided with at least a pair of rows 62 of fins or paddles 64. The two rows are separated by an annular space 66. Each fin in each row, integrally formed with the tire, is oriented or directed both axis-wise and circumferentially so as to slant axially inwardly and in the direction counter to the direction of rotation. The arrow 68 in FIG. 5 (see also FIG. 8) designates the direction of rotation when the vehicle is traveling forwardly. The inner ends of the fins terminate short of the median plane of the tire thus leaving the annular space 66. Each radial face of the wheel means has, integrally formed with the tire, a circular radial wall 70, the diameter of which matches that of the circle on which lie the radially outer ends of the fins. Each wall not only closes the tread at its respective outer side but provides a rim which carries the wheel means over hard surfaces. It is a feature of the invention that the fins in each row are angularly or circumferentially offset relative to the fins in the other row so that each fin delivers water to the annular space 66 without carry-over to the next row of fins. The same characteristics as to tread design will occur in the dual wheels shown in FIGS. 2 and 4, the fins being identically oriented and an equivalent annular space occurring of course between the dual wheels as suggested at 66a. Likewise, radial walls are provided as noted at 70a.

The tread design is preferably such that the angle of each fin disposes its inner end in angularly offset relation to the fin across from it so that no fin ends before another begins, thus improving the ability of the tread to give a smooth ride on hard surfaces. It is also preferred that the tread be approximately divided into thirds crosswise; for example, if the total tread width is fifteen inches, the transverse span of each row of fins will be about five inches and the width of the annular space 66 will be about five inches. Another characteristic of the tread design is that the fins and radial walls or rims are relatively stiff and the tire will not flatten out when the vehicle turns corners, etc., thus improving the balance of the vehicle so far as accommodating the changed center of gravity of the vehicle and rider.

From the description thus far, it will be seen that the arrangement of the rows of fins and the water-confining function of the radial walls or rims give the tread means the ability to literally pump large, continuous volumes of water axially inwardly and circumferentially rearwardly beneath the air chamber of the body. To augment the capacity of the body to ride the ridge or crest of water thus created by the wheel means, the front and rear fender wells have extensions 76 and 78 respectively. These increase the "surfing" ability of the body. The front surf extension may be a downward and rearward extension of the lower rear part of the front fender well and the rear surf extension is similarly formed on the front part of the rear fender well, both extensions extending below the level of the side runners 16. In addition, further intermediate runners 80 are secured at opposite ends to the surf extensions and disposed longitudinally of the body and equally spaced at opposite sides of the longitudinal centerline of the body.

Figure 8:
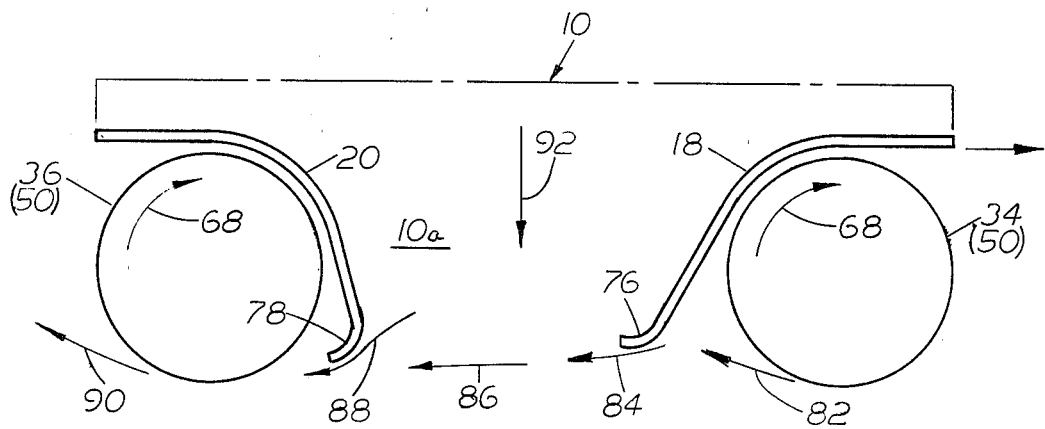
FIG. 8 is a schematic view illustrating the water and air flow as the vehicle travels forwardly.

When the vehicle is operated over water, the front wheel means 50 (36) pumps water rearwardly as aforesaid so as to cause the water to move forcibly in the direction of the arrow 82 (FIG. 8). This crest of water impinges on the front surf member 76 and creates a lifting effect on the body which prevents the vehicle from sinking. The ridge-like volume of water moves rearwardly (arrow 84) beneath the surf extension and thence beneath the air chamber 10a (arrow 86), impinging on the rear surf extension (arrow 88) and is then carried rearwardly by the pumping action of the rear wheel means (arrow 90). Thus, so long as the wheel means continue to be driven, a continuous, forceful flow of water is assured. This flow of water is acted upon by the air from the air chamber (arrow 92), which air is pumped downwardly by action of the engine as described above. The radial walls on the treads of the wheel means confine the flow to the center portion of the vehicle, thus preventing laterally outward waves.

It will be noted that the fin arrangement is just the opposite of the typical cleat arrangement found on farm tractor tires, for example, wherein the cleats are designed to move soil laterally outwardly during forward travel of the tractor. Such design as found in tractor tires would not function in the present vehicle because that type of tread pattern would cause the wheels to "dig in" and spread the water rather than creating the flow and forces described here.

The outside diameter of each tire is in the order of twenty-four to thirty inches and the fins may be about two to three inches or more in height. The width of the tire is in the order of twelve to seventeen inches or so. Given the fact that each tire may be of the pneumatic type, especially of the high-flotation style, the wheel body itself may vary between twelve to eighteen inches in diameter with an appropriate cross-wise dimension to accommodate the width of the tire.

Figure 9:
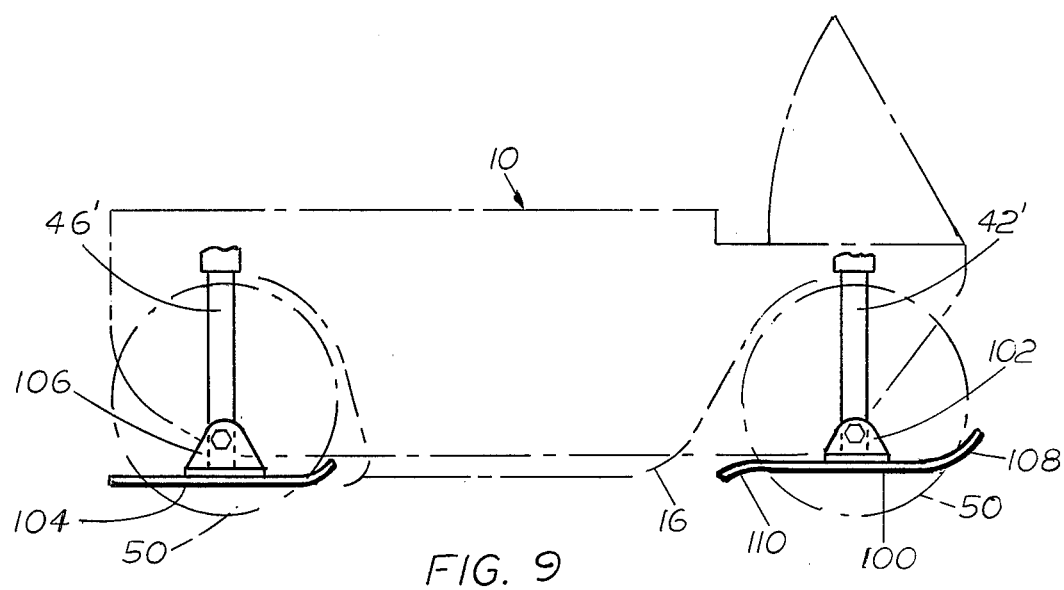
FIG. 9 is a somewhat diagrammatic side elevation of a vehicle with front and rear water-surface-engaging ski-like means respectively alongside the front and wheels.
Figure 10:
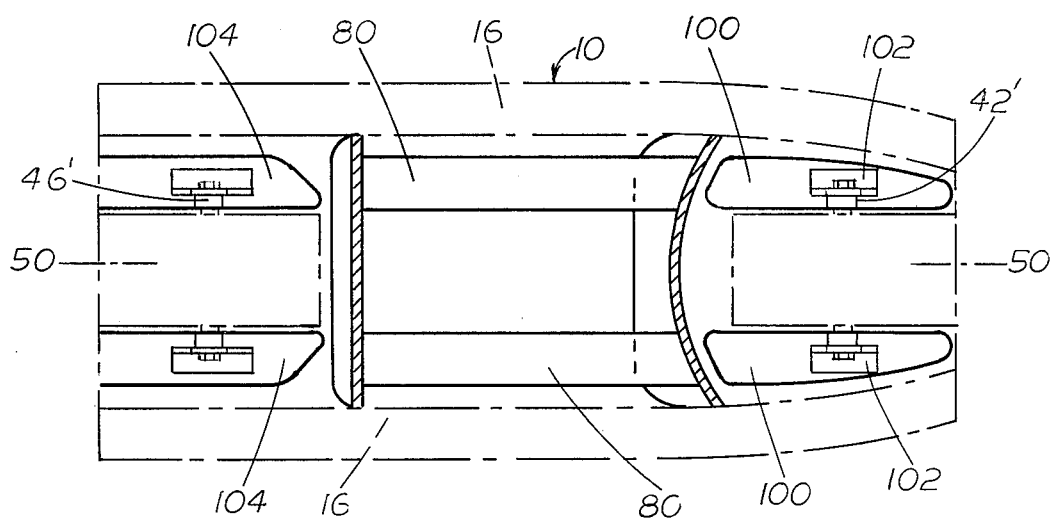
FIG. 10 is a similarly rendered view showing a top view of the same.
Figure 11:
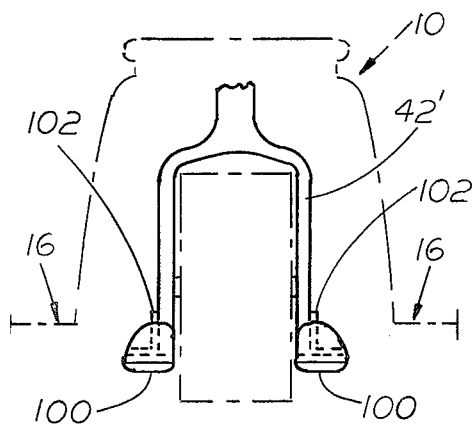
FIG. 11 follows the same pattern in illustrating a front view.

A further modification of the invention is shown in FIGS. 9 through 11. In this modification, it is shown that each wheel means is preferably of the single, wide type as previously described at 50. These are carried by and support the body through the medium of front and rear steerable forks 42' and 46' respectively. The front form serves as means for the mounting of front water-surface-engaging ski means 100, one at or flanking each side of the front wheel means, and these are selectively attachable to and detachable from the fork by means such as indicated at 102. Each ski means is mainly of substantial length and area so as to afford maximum flotation, but each terminates and is shaped at its rear end so as to pass freely into and out of the front fender wheel when the wheel means is steered. The ski means may be made of any suitable material and may have any cross-sectional shape deemed best for the purpose and may be solid or hollow, consistent with lightness of weight, low cost, etc. Somewhat similar ski-like means 104 are provided at opposite sides of the rear wheel means, being detachably carried by the rear fork 46' as at 106. As will be noted, the front ski means is slightly curved upwardly at its front end 108 and downwardly at its rear at 110, the front end serving to facilitate entry onto the water, as from a flying start from shore, for example and the rear end functioning in cooperation with the side runners 16 and the intermediate runners 80. It will be noted that the front and rear ski means are at substantially the level of these runners and are virtually prolongations of the runners 80. The down curve at 110 affords a substantial "lift" to the front of the vehicle in conjunction with the air flow and water flow from the front wheel means. The rear ski means are shown here as being substantially flat but curved up slightly at their rear ends so as to better ride the crest resulting from the co-action of the turbine effect of the wheels. As noted, the ski means are detachable so to be removable and storable when terrain conditions do not necessitate their use. The dimensions of the rear means are such as to enable them to pass closely but freely into and out of the rear fender well as the rear wheel is steered.

Although the foregoing is based upon a preferred embodiment of the invention, it will be apparent to those versed in the art that many modifications may be made without departing from the spirit and scope of the invention.

I claim:

1. A vehicle having a fore-and-aft body including a top, opposite side sheets and front and rear fender wells joined together to form a downwardly opening air compartment wherein the side sheets terminate respectively as fore-and-aft runners, front and rear wheel means respectively in the fender wells and carrying the body, and a power source within the compartment and driving both wheel means, characterized in that the front fender well has a depending, lower rear edge portion directed downwardly and then rearwardly beneath the front edge of the air compartment, the rear fender well has a depending, lower front edge portion directed downwardly and then rearwardly of the rear edge of the air compartment, said edge portions depend to a level below that of the fore-and-aft runners, and at least an additional fore-and-aft runner is joined to and extends between the depending portions, each wheel means has a water-engaging tread portion comprising at least a pair of annular rows of radial, circumferentially spaced apart fins, each fin in each row being directed both axially and circumferentially of the wheel means so as to slant axially inwardly and counter to the direction of the wheel means when the vehicle travels forwardly, the inner ends of the fins in each row terminating short of the fore-and-aft median plane of the wheel means so as to leave an annular space between the rows whereby water engaged by the fins is directed oppositely axially inwardly to the space, the water engaged by the front wheel means fins being directed rearwardly beneath the aforesaid depending rear edge portion and beneath the air compartment for exerting a lifting effect on the vehicle and the water engaged by the rear wheel means is directed rearwardly away from the air compartment.

2. The vehicle of claim 1, further characterized in that there are a plurality of such runners.

* * * * *